United States Patent [19]
Heidemann

[11] Patent Number: 5,111,334
[45] Date of Patent: May 5, 1992

[54] MULTI-STAGE FIBER-OPTIC AMPLIFIER

[75] Inventor: Rolf Heidemann, Tamm, Fed. Rep. of Germany

[73] Assignee: Alcatel N.V., Amsterdam, Netherlands

[21] Appl. No.: 638,509

[22] Filed: Jan. 9, 1991

[30] Foreign Application Priority Data

Jan. 27, 1990 [DE] Fed. Rep. of Germany ....... 4002369

[51] Int. Cl.$^5$ .......................... H01S 3/16; H01S 3/09; G02B 6/00
[52] U.S. Cl. ....................................... 359/341; 372/6; 372/23
[58] Field of Search ...................... 330/4.3; 372/6, 23, 372/68; 455/601, 611; 350/96.13; 359/341

[56] References Cited

U.S. PATENT DOCUMENTS

| | | | |
|---|---|---|---|
| H882 | 1/1991 | Fox | 372/68 |
| 3,731,226 | 5/1973 | Snitzer et al. | 372/68 |
| 4,173,738 | 11/1979 | Boling et al. | 330/4.3 |
| 4,528,671 | 7/1985 | Robbins | 372/68 |
| 4,723,824 | 2/1988 | Shaw et al. | 350/96.15 |
| 4,794,346 | 12/1988 | Miller | 330/4.3 |
| 4,938,556 | 7/1990 | Digonnet et al. | 372/6 |
| 4,963,832 | 10/1990 | Desurvire et al. | 330/4.3 |
| 5,005,175 | 4/1991 | Desurvire et al. | 330/4.3 |
| 5,050,949 | 9/1991 | DiGiovanni et al. | 359/341 |

OTHER PUBLICATIONS

Giles et al; "Dynamic Gain ... Two Stage Fiber Amplifiers"; IEEE Photonics Technol. Lett., vol. 2, #121, Dec. 1990, pp. 866-868.

Saleh et al; "Cascaded, Stagger-Tuned ... Amplifiers"; Nov. 1988, Opt. Lett., vol. 13, #11, pp. 967-969.

Inoue et al; "Mutual Signal . . . 1.54 μm on Wavelength"; Apr. 27, 1989, Elect. Lett., vol. 25, #9, pp. 594-595; abst. only provided.

D. N. Payne and L. Reekie, "Rare-Earth-Doped Fibre Lasers and Amplifiers", Optical Fiber Group, The University, Southampton, England, Proc. ECOC 1988 Brighton.

T. J. Whitley and T. G. Hodgkinson, "1.54 μm ER$^{3+}$-Doped Fibre Amplifier Optically Pumped at 807 nm.", British Telecom Research Labs, Martlesham Heath, England, Proc. ECOC 1988 Brighton.

N. Edagawa, K. Mochizuki and Y. Iwamoto, "Simultaneous Amplification of Wavelength-Division-Multiplexed Signals by a Highly Efficient Fibre Raman Amplifier Pumped by High-Power Semiconductor Lasers", Electronics Letters, v. 23, No. 5, Feb. 26, 1987, pp. 196 & 197.

Primary Examiner—Nelson Moskowitz
Attorney, Agent, or Firm—Spencer, Frank & Schneider

[57] ABSTRACT

A fiber-optic amplifier, whose light signal input and light signal output may be connected with a monomode fiber for 1536 nm light signals, is composed of two or more cascade connected amplifier stages including a fiber piece that amplifies light signals and is doped with at least one lanthanoid, a wavelength selective directional coupler and a pump light source. The output end of the fiber piece of one amplifier stage, when seen in the direction of travel of the light signals, is connected with the one input of the directional coupler of the next-following amplifier stage. The fiber pieces of the individual amplifier stages are different from one another with respect to length and/or doping and/or basic material so as to realize maximum gain for different wavelengths. Such a fiber-optic amplifier offers nearly constant gain over a broad wavelength range.

8 Claims, 1 Drawing Sheet

MULTI-STAGE FIBER-OPTIC AMPLIFIER

CROSS REFERENCE TO RELATED APPLICATION

This application claims the priority of Application Ser. No. P 40 02 369.9, filed Jan. 27, 1990, in the Federal Republic of Germany, the subject matter of which is incorporated herein by reference.

BACKGROUND OF THE INVENTION

The present invention relates to a fiber-optic amplifier.

The publication, *Proc. ECOC* 88, *Brighton*, pages 49 et seq., discloses that optical fibers which are doped with one or more lanthanoids, such as, for example, neodymium, erbium, or ytterbium, and which are based on $SiO_2$ or fluoroid glass, when excited by light of a certain wavelength, act as an amplifier independently of the polarization of the exciting light wave. According to *Proc. ECOC* 88, *Brighton*, pages 58 et seq., an $SiO_2$ fiber doped with $Er^{3+}$ was fed with light signals through a directional coupler and connected with pump light sources of different pumping powers. It was then found that the degree of gain and a maximum gain wavelength in a range between 1520 and 1560 nm is a function of the pumping power of the pump light source. An 870 nm semiconductor laser was employed as the laser light source.

There are also reports that the wavelength at which maximum gain occurs in a fiber piece likewise changes as a function of the doping of the fiber piece.

In fiber-optic amplifiers of the above-mentioned type employed experimentally in the past, the gain was a function of the wavelength of the light signals, with the range of maximum gain being relatively narrowbanded. The gain decreases exponentially on both sides of this narrow band range of maximum gain as indicated in the second reference mentioned above. However, in glass fiber transmission systems operating with intensity modulation and direct detection, only the most broadbanded transmission function with the slightest possible ripple is permissible.

SUMMARY OF THE INVENTION

It is an object of the present invention to provide a fiber-optic amplifier of the above-mentioned type which offers the most constant possible gain over a broad wavelength range of several 10 nm.

This is accomplished in a fiber-optic amplifier of the mentioned type according to the invention by providing two or more cascaded amplifier stages including a fiber piece that amplifies light signals, a wavelength selective directional coupler and a pump light source, the fiber pieces of each cascaded amplifier being different from one another so as to achieve maximum gain for different wavelengths.

The measures according to the invention make it possible to provide each individual amplifier stage with an individual gain function whose maximum gain wavelength range is shifted relative to that of an adjacent stage. In this way an amplifier function results at the signal output of the fiber-optic amplifier which is a function of that wavelength whose maximum gain is approximately constant over a broad wavelength range in the manner of a bandpass filter characteristic without exhibiting significant ripple. Such a fiber-optic amplifier is advantageously and particularly suitable for glass fiber transmission systems. Another advantage of such a fiber-optic amplifier, in addition to the large constant gain over a wide bandwidth, is a high saturation output power and a low signal to noise ratio since the input stage can be separately optimized for the lowest possible noise and the output stage for high output power.

This is accomplished by making the amplifier fiber pieces different with respect to their fiber geometry or with respect to the type and quantity of dopant for example. The availability of different fiber pieces may be realized in a simple manner in that different types of fiber are produced in long lengths and are each cut to the appropriate length to form such a fiber-optic amplifier which is then employed in different ways in the individual amplifier stages.

Further advantageous features result from varying other aspects such as the pumping power of the pump light sources of the individual amplifier stages for example.

BRIEF DESCRIPTION OF THE DRAWINGS

Further details of the invention will become evident in the description below in which the invention is described and explained in greater detail with reference to an embodiment thereof that is illustrated in the drawing figures in which.

DETAILED DESCRIPTION OF THE PREFERRED EMBODIMENT

Figure 1:
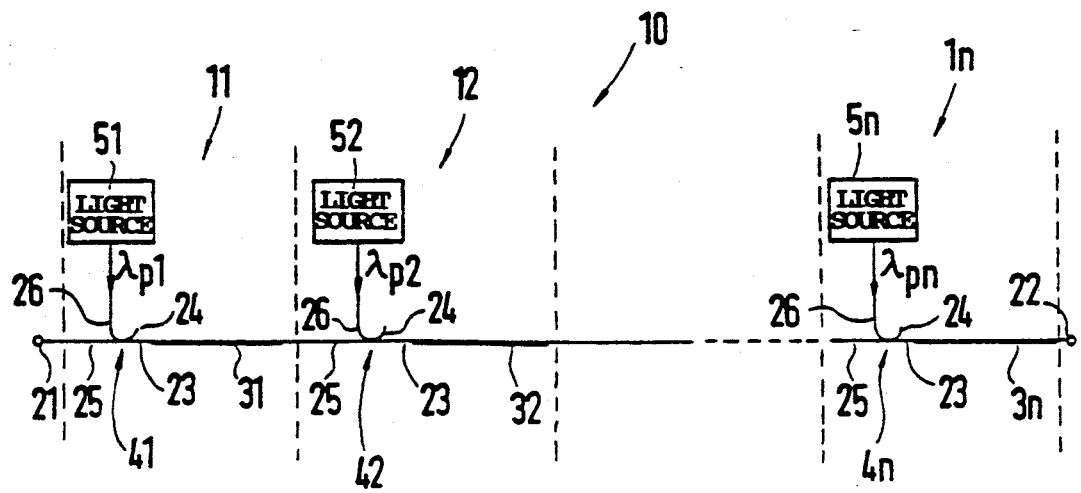
FIG. 1 is a schematic representation of an n-stage fiber-optic amplifier according to a preferred embodiment of the present invention.

The fiber-optic amplifier 10 according to a preferred embodiment of the invention and illustrated in FIG. 1, with its cascaded n amplifier stages 11, 12, . . . , 1n and the economical availability of pump light sources, permits a considerable gain V in the light signal coming in on fiber-optic transmission paths at a wavelength $\lambda_S$ preferably within the 1536 nm band. In particular, this gain is uniform over a broad frequency band.

The fiber-optic amplifier 10 has a light signal input 21 and a light signal output 22 by way of which it is disposed, for example, within a fiber-optic transmission path composed of, for example, monomode fibers. According to FIG. 1, each amplifier stage 11, 12, . . . , 1n of fiber-optic amplifier 10 includes a fiber piece 31, 32, . . . , 3n of a defined length $L_1, L_2, \ldots L_n$, which amplifies the light signal and whose basic material is, for example, $SiO_2/Ge$, $SiO_2/Al$ or the like and is doped with at least one lanthanoid, for example $Er^{3+}$, of a certain type and quantity.

Each fiber piece 31, 32, . . . 3n is connected at its input end, when seen in the direction of travel of the light signals, with a first output end 23 of a wavelength selective directional coupler 41, 42, . . . , 4n whose second output end 24 is terminated without reflection and whose second input end 26 is connected with a pump light source 51, 52, . . . , 5n.

The first input end 25 of directional coupler 41 of first amplifier stage 11 is connected with the light signal input 21 of fiber-optic amplifier 10, while each first input end 25 of directional couplers 42, . . . , 4n is connected with the output end, when seen in the direction of travel of the light signals, of fiber piece 31, 32, ..., 3n−1 of the preceding amplifier stage 11, 12, 1n−1.

Each pump light source 51, 52, ..., 5n emits pump light in the 807 nm range ($\lambda_{p1}, \lambda_{p2}, ..., \lambda_{pn}$) and is realized by a cost efficient printer laser, a CD laser or the like. For example, such lasers exhibit pumping powers of several 10's of mW.

Figure 2:
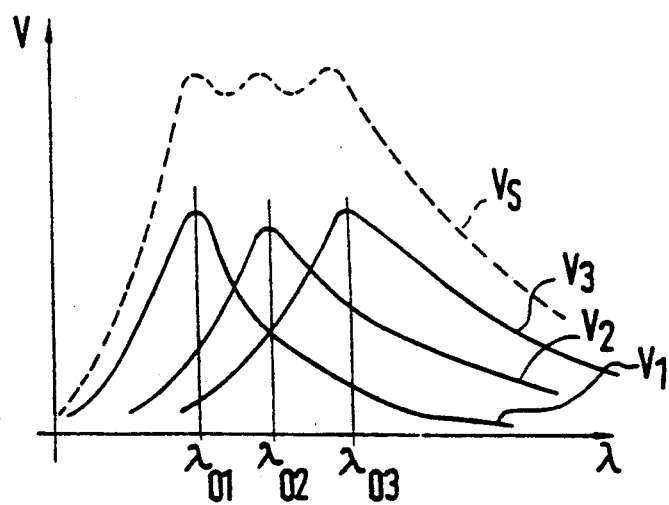
FIG. 2 shows examples of amplifier characteristics of individual amplifier stages and the resulting characteristic of a fiber-optic amplifier composed of three amplifier stages according to the embodiment of FIG. 1.

Each fiber piece 31, 32, ..., 3n, whose lanthanoid ions are excited by the pump light ($Z_p$) to rise to a higher energy level whose energy is then released by the light signal ($\lambda_S$) has a gain characteristic $V_1, V_2, ..., V_n$ which is a function of the wavelength of the light signal band as shown in FIG. 2 at 61, 62, 63. At a certain wavelength $\lambda_{01}, \lambda_{02}, ..., \lambda_{0n}$ of the light signal, this gain characteristic has a maximum of a relatively narrow bandwidth.

If pump light sources 51, 52, ..., 5n of essentially identical pumping power are employed, essentially the same characteristics result with respect to order of magnitude, that is, characteristics $V_1, V_2$ and $V_3$ (if there are three amplifier stages 11, 12, 13) have the same maximum gain with respect to order of magnitude over the same bandwidth. The shift of characteristics $V_1, V_2, V_3$ as a function of the wavelength of the transmitted light signal band, that is, the shift of the maximum gain wavelength range, is realized by the different configurations of fiber pieces 31, 32, ..., 3n in the individual amplifier stages 11, 12, ..., 1n. For example, different lengths $L_1, L_2, ..., L_n$ (e.g., in a range between 1 and 5 m) are provided for the individual fiber pieces 31, 32, ..., 3n. Instead, or in addition, it is possible to vary the type and quantity of doping of the basic fiber material of the individual fiber pieces 31, 32, ..., 3n. For example, the basic fiber material may be doped, in addition to $Er^{3+}$, also with Yb, P and Al or the like. It is further possible to provide the dopant or dopants at another location of the fiber cross section. Furthermore, or in addition, the fiber geometry of the individual fiber pieces may also be varied in the amplifier stages.

In any case, the different wavelength positions of gain characteristics $V_1, V_2, ..., V_n$ of the individual amplifier stages according to FIG. 2 produce a resulting gain characteristic $V_S$ at the signal output 22 of fiber-optic amplifier 10. This resulting gain characteristic is the sum of the individual characteristics $V_1 + V_2 + ... + V_n$ and, with considerably less ripple, exhibits an essentially uniform maximum gain over a considerable bandwidth of the light signal wave band.

It is understood that the magnitude of the maximum gain and its ripple are dependent on the number of amplifier stages 11, 12, ..., 1n employed. For example, a broad gain characteristic with low ripple results over a wavelength range between 1530 nm and 1560 nm.

It will be understood that the above description of the present invention is susceptible to various modifications, changes and adaptations, and the same are intended to be comprehended within the meaning and range of equivalents of the appended claims.

What is claimed is:

1. A fiber-optic amplifier having stages, said amplifier for use with a monomode fiber for 1536 nm light signals, each said amplifier stage comprising:
   a fiber piece doped with at least one lanthanoid and having an input end and an output end;
   a wavelength selective directional coupler including first and second inputs, and a first output, said coupler first input for receiving input light signals, said coupler first output connected to the fiber piece of said amplifier stage for outputting light signals to said fiber piece; and
   a pump light source, connected to said second input of said directional coupler for inputting pump light to said directional coupler;
   wherein two or more of said amplifier stages, each being composed of a fiber piece, a wavelength selective directional coupler and a pump light source, are provided connected in cascade so that the output end of the fiber piece of one amplifier stage is connected with the first input of the directional coupler of a next-following amplifier stage, and wherein the fiber pieces of the individual amplifier stages differ from one another with respect to at least one of length, doping and basic material, whereby maximum gain over a broad wavelength range is realized.

2. A fiber-optic amplifier as defined in claim 1, wherein the fiber pieces of the individual amplifier stages are different with respect to at least one of type and quantity of dopant.

3. A fiber-optic amplifier as defined in claim 1, wherein the fiber pieces of the individual amplifier stages are different with respect to their fiber geometry.

4. A fiber-optic amplifier as defined in claim 1, wherein the pump light sources of the individual amplifier stages are different with respect to their pumping power.

5. A fiber-optic amplifier as defined in claim 1, wherein the length of each of the fiber pieces of said amplifier stages is in a range of from about 1 to 5 m.

6. A fiber-optic amplifier as defined in claim 1, wherein the pump light source includes an 807 nm laser.

7. A fiber-optic amplifier as defined in claim 6, wherein the 807 nm laser is one of a printer laser and a CD laser.

8. A fiber-optic amplifier as defined in claim 2, wherein the fiber pieces of the individual amplifier stages are different with respect to their fiber geometry.

* * * * *